Nov. 25, 1969 W. K. FRENCH 3,479,987

APPARATUS FOR TAKING FINGERPRINTS

Filed Oct. 14, 1966 3 Sheets-Sheet 1

INVENTOR
WALTER K. FRENCH

BY Ronald L. Kranzdorf

ATTORNEY

Nov. 25, 1969 W. K. FRENCH 3,479,987

APPARATUS FOR TAKING FINGERPRINTS

Filed Oct. 14, 1966 3 Sheets-Sheet 2

Nov. 25, 1969 W. K. FRENCH 3,479,987

APPARATUS FOR TAKING FINGERPRINTS

Filed Oct. 14, 1966 3 Sheets-Sheet 3

United States Patent Office 3,479,987

Patented Nov. 25, 1969

3,479,987

APPARATUS FOR TAKING FINGERPRINTS

Walter K. French, Montrose, N.Y., assignor to International Business Machines Corporation, Armonk, N.Y., a corporation of New York Filed Oct. 14, 1966, Ser. No. 586,774
Int. Cl. B41k *1/20;* B05c *11/10*
U.S. Cl. 118—31.5 1 Claim

ABSTRACT OF THE DISCLOSURE

A method and apparatus for preparing for fingerprinting by securing a thinly inked strip to a spring-mounted table whose tension may be adjusted to provide uniform inking and a second resiliently mounted table for securing a fingerprint card are shown. Both tables are supported with three degrees of freedom.

This invention relates to apparatus for taking fingerprints and more particularly to a fingerprinting apparatus which enables relatively unskilled individuals to obtain high quality prints which may be machine read.

The standard method now employed for fingerprinting an individual is to use a roller to spread a fairly thin coat of fingerprint ink on a glass sheet, ink the finger to be printed by rolling the finger on the inked glass, and then roll the inked finger onto a fingerprint card to deposit the print thereon. There are a number of potential sources of error when taking fingerprints with this method which reduce the probability of obtaining of high quality prints. One problem with the standard method is that of obtaining a thin enough and uniform enough coat of ink on the glass. If the ink is spread too thickly, the ink will get into the spaces between ridges on the finger leading to smudges or other imperfections in the final print. A nonuniform distribution of ink will lead to nonuniform ink distribution in the final print. A second problem is in assuring that proper pressure is applied to the finger during the inking operation. If too little pressure is applied to the finger, adequate ink for printing may not be applied to all ridges and blank spaces may appear in the final print. Conversely, if too great a pressure is applied to the finger during inking, ink will be forced into the space between ridges, as well as on the ridges, leading to the smudges previously mentioned. Relative movement between the finger and the inked glass (i.e., sliding) can also lead to nonuniform ink distribution on the finger and smudging.

Proper pressure on the finger is also important during the printing operation. Again, if too little pressure is applied, portions of the finger may not print leading to gaps in the fingerprint. If too much pressure is applied, the finger will tend to flatten out giving wide ridges which may run into each other and otherwise distorting the print. The person taking the fingerprint must also be careful that, while the finger is being rolled during the printing operation, there is no sliding movement between the finger and the card. Such relative movement would cause smearing of the print.

As long as prints are being manually scanned and matched, smudges, smears, gaps, and other defects of a poor quality print are a nuisance but not a serious problem. However, when prints are to be automatically scanned and recognized, a higher quality print is required than can normally be obtained by even a highly skilled individual using existing techniques. Since fingerprints can be classified and recognized faster, cheaper, and more efficiently by use of automatic techniques than manually, it is important that some method be provided of taking fingerprints of sufficiently high quality so that they may automatically be scanned. This method must be sufficiently infallible so that it may be successfully practiced by ordinary police officers, civil service clerks, or others without requiring any special skills or training.

Another problem with the existing method of taking fingerprints is that, if one out of the ten prints on a fingerprint card is of poor quality, the entire operation must be repeated for all ten fingers. This is a time consuming and bothersome procedure and, with an unskilled fingerprint taker, could lead to the wasting of several fingerprint cards before a complete set is obtained. In the alternative, the person may use a set of prints, where one or more of the prints are of lower quality than would be desired, rather than go to the trouble of taking a complete new set of prints. It would therefore be desirable if the fingerprint taking method could be modified so as to permit the retaking of a single print, where this print is of poor quality, while retaining the use of the remaining prints of the set.

It is therefore a primary object of this invention to provide an improved fingerprint taking apparatus.

A more specific object of the present invention is to provide a fingerprinting apparatus which permits a relatively unskilled person to take prints of high enough quality to be machine read.

A still more specific object of this invention is to provide a fingerprint taking apparatus which permits the thickness and uniformity of the ink, the pressure applied to the finger during inking and printing, and the relative movement between the finger and the ink strip or fingerprint card to be controlled in a manner independent of the person taking the fingerprint.

Another object of the invention is to provide a means for correcting a single poor quality print while utilizing the remaining good prints of the set.

In accordance with these objects this invention provides an apparatus for taking fingerprints which includes a fingerprint kit having two resiliently mounted tables, each of which may move with at least three degrees of freedom. In the preferred embodiment of the invention, the tables also move with three rotational degrees of freedom. A strip having a thin, uniform coat of ink deposited thereon is secured to one of the tables and a fingerprint card is secured to the other table. The use of a preinked strip assures that the ink layer will be uniform and of proper thickness. The resilient mounting of the inking table assures that excess pressure will not be applied to the finger during inking and also prevents sliding of the finger on the inking table during the inking operation. Similarly, the resilient mounting of the printing table prevents excess pressure from being applied to the finger during the printing operation and, since the table may move in a lateral direction, any tangential forces applied to the finger tend to move the table rather than cause the finger to move relative to the card. Relative movement between the finger and the card may be further inhibited by the addition of an adhesive material to the fingerprint card on the portions thereof where the prints are to be made.

Tabs may also be provided which can be secured over an individual print of poor quality so that the print may be retaken without requiring the retaking of the entire set. These tabs may also have adhesive material on their surface so as to impede sliding motion during the printing operation.

The foregoing and other objects, features and advantages of the invention will be apparent from the following more particular description of a preferred embodiment of the invention, as illustrated in the accompanying drawings.

Figure 1:
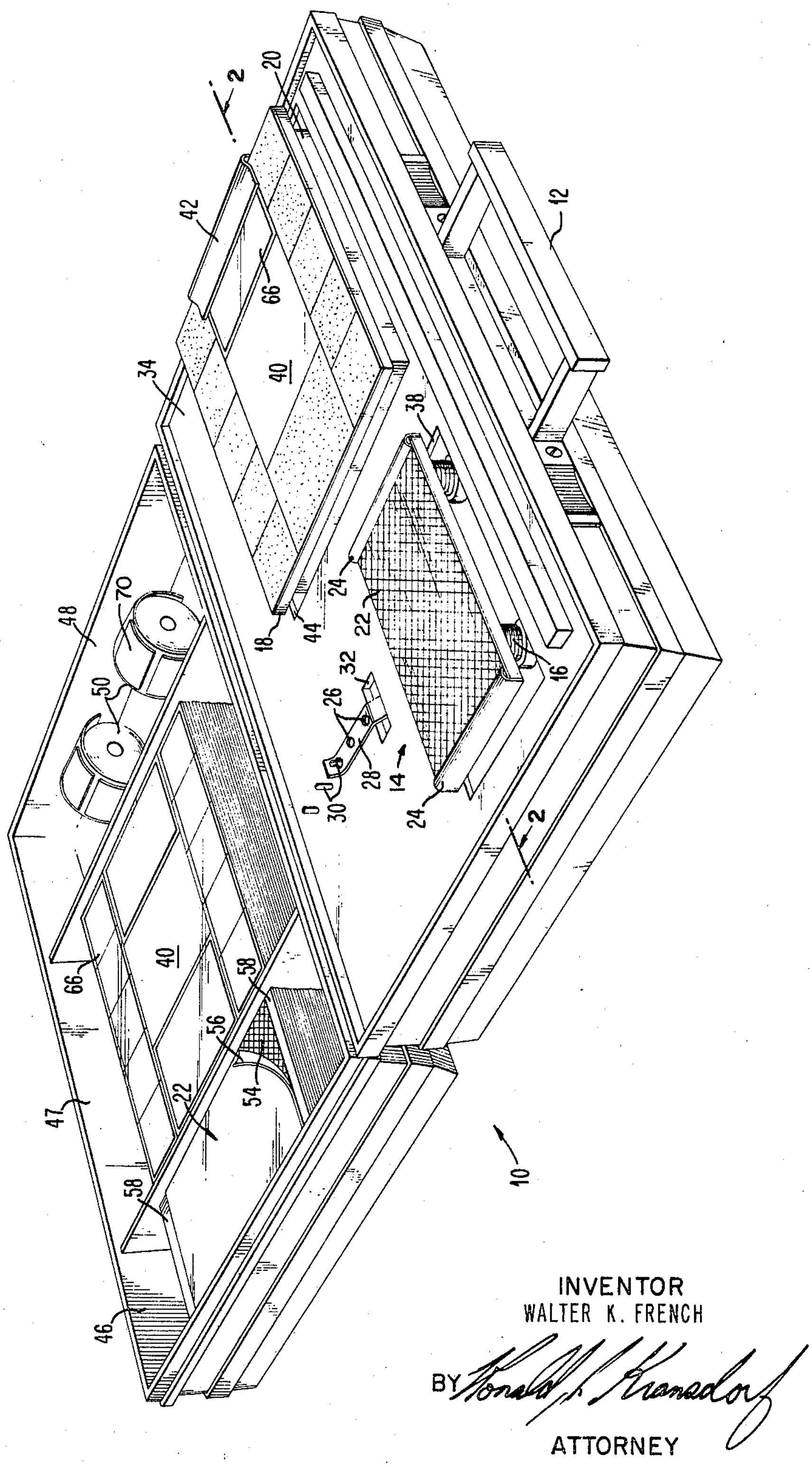
FIG. 1 is a perspective view of a preferred embodiment of the fingerprint taking kit of the invention which kit is set up to be used.

Referring first to FIG. 1, it is seen that the entire fingerprint kit may, for example be contained in a standard attaché case 10. A handle 12 is provided for carrying the case which handle may be made retractable so as to be out of the way during a fingerprinting operation. The base of case 10 has a table 14 resiliently mounted on springs 16 and a table 18 resiliently mounted on a slab 20 of foam material such as foam rubber or foam plastic. Tables 14 and 18 are shown in more detail in FIG. 2. From FIGS. 1 and 2 it is seen that table 14 is adapted to have a thinly inked strip 22 secured thereto by spring clips 24. The ambient tension on springs 16 may be adjusted by hooking holes 26 in belt 28 on different ones of the pins 30. Belt 28 passes through an open 32 in cover plate 34 on the base of attaché case 10 and over pulley 36 to connect to the lower side of table 14. The tension adjustment provided by belt 28 permits variations in the hardness of the fingers of an individual being fingerprinted to be compensated for. Springs 16 and belt 28 permit table 14 to move with three degrees of freedom into and around opening 38 in cover plate 34.

Table 18 is adapted to have a fingerprint card 40 secured thereto by a spring clip 42. Spongy material 20 permits table 18 to likewise move with three degrees of freedom in opening 44 of cover plate 34. While a tension adjacent mechanism has not been shown for table 18, it is to be understood that one similar to belt 28 could be provided should it appear desirable to do so.

The cover of attaché case 10 has three compartments 46–48 which contain a supply of preinked strips 22, fingerprint cards 40, and correction tab rolls 50 respectively. FIG. 3 is an illustration of an inked strip suitable for use with the embodiment of the invention shown in FIGS. 1 and 2. This strip consists of a base sheet 54 which may for example be thin plastic or wax paper on which a suitable ink has been deposited or rolled. The ink may be a standard wet fingerprint ink or dry lead black particles. In the alternative, lamp black may be the vapor deposited on a plastic or wax apper sheet to obtain the desired uniform thin ink coating. The process for forming the inked sheet 54 would be similar to that used to make carbon paper except that the ink used would more readily come off. A protective cover sheet 56, for example, wax paper is placed over inked sheet 54 and is held thereon by the wet inked surface of sheet 54. Cardboard tabs 58 are secured to sheet 54 to give the strip body. If necessary, sheet 56 may also be secured to tabs 58 in a manner such that they may be easily separated.

Figure 2:
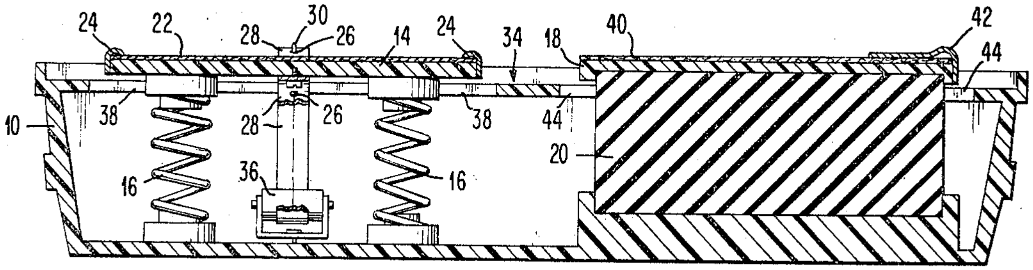
FIG. 2 is a cutaway view taken along the line 2—2 in FIG. 1.
Figure 3:
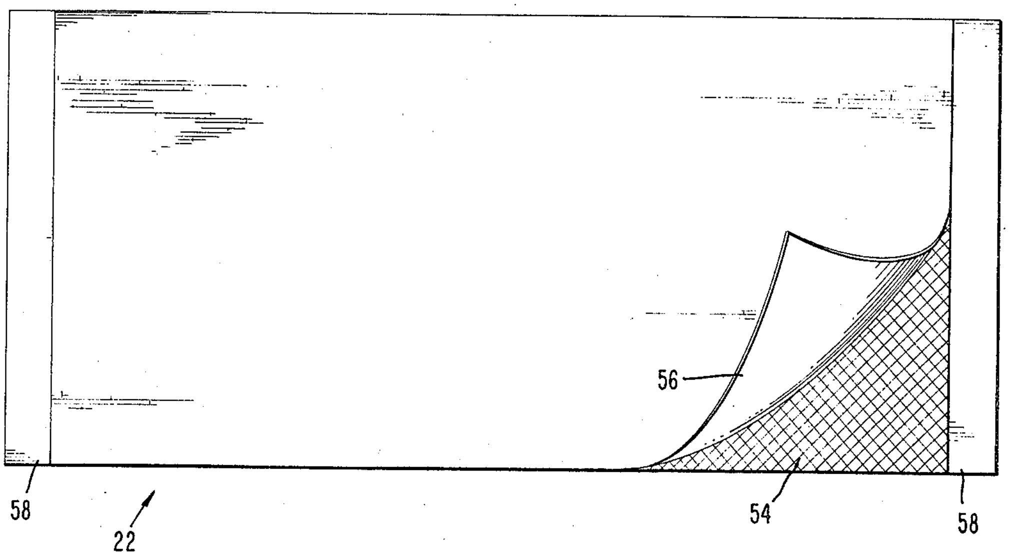
FIG. 3 is an illustration of a preinked strip suitable for use with the preferred embodiment of the invention.
Figure 4:
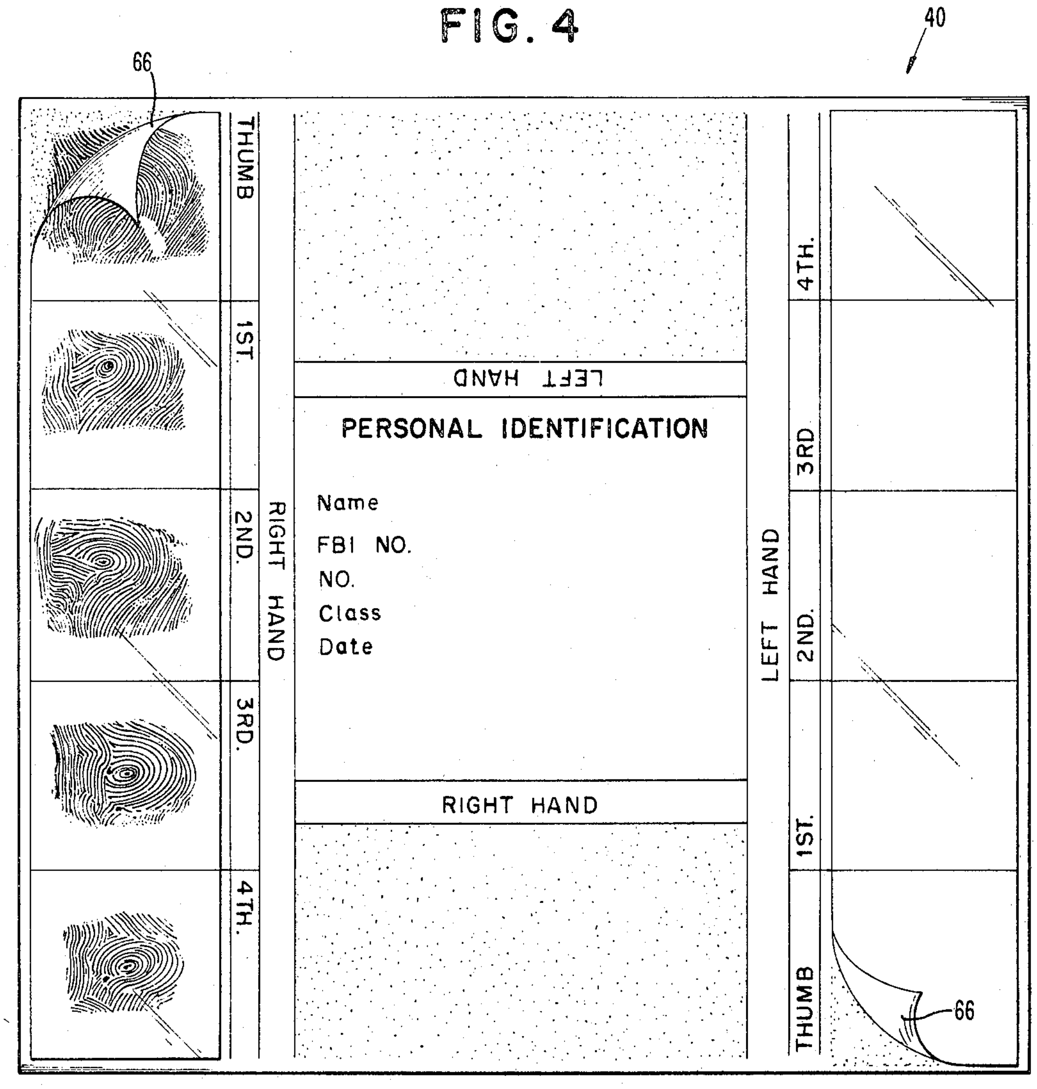
FIG. 4 is an illustration of a fiingerprint card suitable for use with the preferred embodiment of the invention.

FIG. 4 is an illustration of a fingerprint card suitable for use with the fingerprint kit of FIGS. 1 and 2. Card 40, which could for example be made of paper or plastic, has selected portions around its periphery for placing the print of each individual finger of the right and left hand and for a complete print of each hand. In the center of the card is an area for typing or writing other information concerning the individual. A pressure sensitive adhesive is applied to the card 40 over the peripheral areas thereof where prints are to be placed. The adhesive may be sprayed on the card or a two sided plastic pressure sensitive tape may be placed over the selected portions of the identification card. The pressure sensitive adhesive which is used should be of a type which does not dry out and should not adhere too well to the finger so as to make it difficult to remove the finger from the card when the fingerprinting operation has been completed. A transparent sheet 66, which is for example waxed on one side to prevent good adherence to the adhesive, is placed over the adhesive containing portions of the fingerprint card when the card is stored. Sheet 66 is peeled off the card when the card is to be placed on table 18 and is then placed over the completed prints with its nonwaxed side down so that it adheres strongly to the adhesive and protects the finished prints from dirt or smudging.

When an individual is to be fingerprinted, attaché case 10 is first opened and an inked strip 22 is then remove from the pile in comparment 46. Protective cover sheet 56 is removed from the strip and the strip is then clipped on table 14 by use of spring clips 24. A fingerprint card 40 is then taken from the pile in compartment 47 and the protective strips 66 removed therefrom. The fingerprint card is then placed on table 14 and secured thereto by spring clip 42. If necessary, the tension on table 14 may be adjusted by moving belt 28 to place holes 26 on different ones of the pins 30.

When these preliminary operations have been completed, the operator takes each finger of the individual and first rolls it on the inked strip 22 to get a thin uniform coat of ink on the ridges of the finger then rolls it on the appropriate portion of fingerprint card 40 to deposit the desired print thereon. The resilient mounting of table 14 prevents any smearing of the ink during the inking operation and also prevents excessive pressure from being applied to the ink strip (excessive pressure causing a downward movement of the table) thereby keeping ink out of the spaces between ridges. Similarly, the resilient mounting of table 18 prevents excessive pressure from being applied to the fingerprint card during the printing operation, and the resilient mounting, in conjunction with the adhesive on the card, prevents relative movement between the finger and the card during the printing operation thereby eliminating smudges from the final print.

Figure 5:
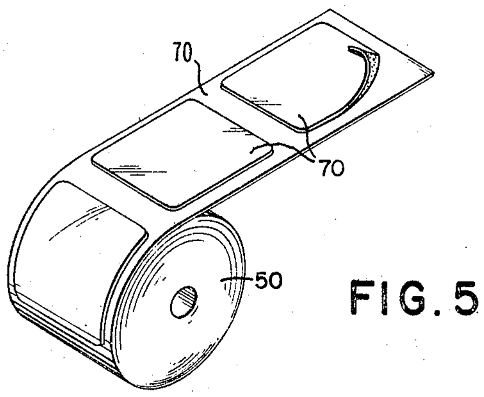
FIG. 5 is an illustration of a strip of correction tabs suitable for use with the preferred embodiment of the invention.

FIG. 5 shows in more detail a roll 50 of correction tabs. Each tab 70 of this roll has a pressure sensitive adhesive of the same type employed on card 40 on its lower surface which causes it to adhere to the roll. When, for some reason, it is determined that one of the prints on card 40 is either erroneous or of too poor a quality to be easily machine read, a tab 70 is peeled off of a roll 50 and placed over the portion of card 40 containing the erroneous print with its adhesive side up. The tab is secured to card 40 by the adhesive on the card. The finger for which the erroneous print was made is then reinked and rolled onto the correction tab to provide a complete set of good prints without requiring the entire card to be redone.

When the printing operation has been completed, including the printing on any necessary correction tabs, card 40 is removed from table 18 and transparent strips 66 are placed over the prints, with their non-waxed side down, to protect the prints. Used ink strip 22 may be removed from the table 14 and disposed of.

While in FIG. 1, the resilient mounting for table 14 has been shown as springs and the resilient mounting for table 18 has been shown as spongy material, it is apparent that one or the other of these resilient mountings would probably be used for both tables in a given kit. Both have been shown in FIG. 1 merely for purposes of illustration. It is also apparent that a tension adjustment such as belt 28 could be provided for table 18 as well as for table 14. The tension adjustment could also assume other forms such as, for example, a screw or can adjust to raise the base of springs 16 or slab 20 combined with a fixed-length chain securing the table to base 10. An adjustment of this type has the advantage that the position of the able remains constant rather than being lowered as with the adjustment shown in FIG. 1. Another possible modification would be to replace the individual correction tabs 70 with a roll 50 of tabs which look, for example, like a roll of masking tape, with perforations between tabs to permit easy removal of tabs of the proper size.

What is claimed is:

1. In a fingerprint taking kit:

a supporting base, a resiliently mounted table for fingerprinting supported on said supporting base by at least four columnar resilient supports for permitting motion of said table upon said supports with at least three degrees of freedom, and means for adjusting the tension applied to said resiliently mounted table comprising a belt secured centrally to the lower surface of said table, a roller cooperating with said belt secured to said base centrally beneath said table, said belt having hooking holes therein, a plurality of pins secured to a member carried on said support, said pins being adapted to secure said belt in cooperation with said hooking holes, said table including a readily replaceable independent, preinked thin strip having a thin uniform layer of fingerprinting ink thereon, and means for removably clipping said thin strip to said table.

References Cited

UNITED STATES PATENTS

| | | | |
|---|---|---|---|
| 1,596,130 | 8/1926 | Underwood et al. | 118—264 |
| 1,861,367 | 5/1932 | Smith et al. | 118—31.5 |
| 2,144,849 | 1/1939 | Moore | 269—310 X |
| 2,521,817 | 9/1950 | Andresen et al. | 118—264 |
| 2,736,114 | 2/1956 | Krueger. | |
| 3,223,096 | 12/1965 | Goldberg et al. | 15—104.94 |
| 213,453 | 3/1879 | Ruger | 118—26 |
| 1,124,531 | 1/1915 | Saltzman | 101—34 |
| 1,826,991 | 10/1931 | Carroll et al. | 281—44 X |
| 2,096,925 | 10/1937 | Seres. | |
| 1,951,203 | 10/1934 | Pitman | 118—31.5 |
| 2,384,018 | 9/1945 | Doepner | 118—503 |
| 2,500,612 | 3/1950 | Krogh | 118—31.5 |
| 2,746,192 | 5/1956 | Norton | 118—500 |
| 2,782,543 | 2/1957 | Soto | 118—31.5 |
| 2,932,277 | 4/1960 | Borah | 120—6 X |
| 3,028,836 | 4/1962 | Strauss | 118—500 |
| 3,324,827 | 6/1967 | Powell et al. | 118—503 |

FOREIGN PATENTS

| | | |
|---|---|---|
| 5,251 | 4/1915 | Great Britain. |
| 37,010 | 11/1912 | Sweden. |

WALTER A. SCHEEL, Primary Examiner

JOHN P. McINTOSH, Assistant Examiner

U.S. Cl. X.R.

118—264